United States Patent Office 3,479,381
Patented Nov. 18, 1969

3,479,381
PREPARATION OF METAL ALKOXIDES
Maurice M. Mitchell, Jr., Wallingford, Pa., assignor to Atlantic Richfield Company, Philadelphia, Pa., a corporation of Pennsylvania
No Drawing. Filed May 23, 1967, Ser. No. 640,557
Int. Cl. C07f 5/06, 3/00; C07c 31/28
U.S. Cl. 260—448                    5 Claims

ABSTRACT OF THE DISCLOSURE

Metal alkoxides are prepared by reaction of alcohols and metal hydroxides in the presence of zeolitic materials which establish a favorable shift of equilibrium by removing water from the reaction system.

---

The present invention relates to the preparation and preservation of metal alkoxides and more particularly, to a novel process for obtaining a shift in equilibrium which favors the production and preservation of metal alkoxides.

Background of the invention

Metal alkoxides find application as strong base catalysts, for example, in Meerwein-Ponndorf reductions, etc. The normal method of making these alkoxides is illustrated by the preparation of sodium methoxide by reaction of metallic sodium and methyl alcohol at room temperature. Hydrogen is a by-product of this reaction. It is known that other active metals also react similarly at room or slightly elevated temperatures. For example, anhydrous methyl alcohol reacts with magnesium to give magnesium methoxide and hydrogen. Amalgamated aluminum reacts with ethyl alcohol, i-propyl alcohol or t-butyl alcohol to give respectively aluminum ethoxide and hydrogen, aluminum i-propoxide and hydrogen or aluminum t-butoxide and hydrogen.

Since hydrogen is evolved in the conventional process for the preparation of metal alkoxides, necessary precautions must be observed in venting or recovering this colorless, inflammable gas. Certain well-known precautions connected with the use of metals, such as sodium, in their metallic state also be observed. Another recognized problem associated with the conventional preparation of metal alkoxides is that extraneous moisture establishes an unfavorable shift in the reaction equilibrium. Since water is a considerably stronger acid than alcohols, metallic alkoxides are hydrolyzed almost completely by water.

Summary of the invention

It has now been discovered that these and other problems are overcome in accordance with the novel process of the present invention by reacting a metal hydroxide and an alcohol in the presence of zeolitic material which selectively adsorbs water and does not react with either the alcohol or the resulting alkoxides. By employing zeolite or molecular sieve material to continuously remove water from the reaction system, the reaction equilibrium is shifted in a favorable direction.

Preferred embodiments

In general, any of the known metal alkoxides, including alkali metal alkoxides, such as lithium, sodium, potassium, rubidium or cesium alkoxide, magnesium alkoxide, aluminum alkoxides, etc., may be prepared in accordance with the present invention by reaction of the respective metal hydroxide of Group I, II or III metals of the periodic table of elements with an alcohol having the empirical formula $C_nH_{2n+2}O$, wherein $n$ is 1 to 18—the applicability of this process with respect to higher molecular weight alcohols being limited only by the solubility of the metal hydroxide in the particular alcohol employed.

Normally, this reaction is conducted at a temperature between ambient temperature and a moderately elevated temperature which is below the boiling point of the alcohol employed. Cooling is not detrimental to the reaction, but heating to a temperature sufficient to force a portion of water away from the zeolitic material employed tends to reduce the yield of alkoxide produced. A preferred operating temperature range is between about 20 and about 60° C. When heating or cooling is required, the desired adjustment in temperature may be accomplished by the use of a jacketed vessel to either supply heat to the reactants or cool the reactants. Agitating the reactants with either mechanical agitators or a non-reactive gas medium tends to reduce the time needed to reach equilibrium. The use of zeolitic material in finely divided form also tends to decrease the time required to reach equilibrium. However, neither agitation nor the use of zeolitic material in finely-divided form is essential to this process. The reaction can be effected in a fixed bed.

Suitable zeolitic material for use in the present invention includes natural or synthetic molecular sieves. Included among these are such natural zeolitic molecular sieves as chabazite, faujasite, eironite, mordenite and gemilite and such synthetic zeolitic molecular sieves as types A and X. Zeolites possess the characteristic of being able to undergo dehydration with little, if any change in crystal structure.

Preferred synthetic zeolitic molecular sieves are the type A zeolites, which are truncated cubo-octahedra with about 48 tetrahedra, and particularly, types 3A and 4A in which the numbers correspond approximately to the nominal pore size openings in angstrom units. Type 5A is a suitable molecular sieve when higher molecular weight alcohols are employed. Type 3A and type 4A sieves are dehydrated potassium and sodium zeolites, respectively, and type 5A is dehydrated calcium zeolite—the three zeolites having the same crystalline structure and being readily interchangeable by simple basic change procedures. Type A zeolites are represented by the following approximate empirical formula:

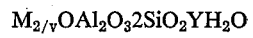
$$M_{2/v}OAl_2O_3 2SiO_2 YH_2O$$

wherein M represents a metal in Groups I, II of the periodic table such as potassium, sodium, calcium, and strontium; transition metals of the periodic table such as nickel; hydrogen or ammonium; $v$ represents the value of M and Y may be any value between 1–6 depending on the nature of M. The transition metals are those whose atomic numbers are from 21–28, from 39–46 and from 72–78 inclusive. Thus, for example, the empirical formula for type 4A zeolite is $Na_2OAl_2O_3 2SiO_2 4–5H_2O$.

Synthetic zeolitic molecular sieves of type X are truncated octahedra, with access to the inner cavity by four 12-sided windows each having a diameter of about 8–9 angstroms. Type 10X and type 13X sieves are calcium and sodium zeolites, respectively. The empirical formula for type 135 zeolite is

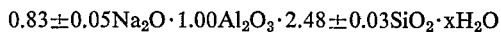
$$0.83 \pm 0.05 Na_2O \cdot 1.00 Al_2O_3 \cdot 2.48 \pm 0.03 SiO_2 \cdot xH_2O$$

Regardless of whether natural or synthetic zeolite material is employed, the particles of material utilized are preferably regular in shape and size and must be sufficiently hard or attrition-resistant that they do not wear away during use, regeneration or other handling. The zeolitic material is activated or regenerated by heating to effect the loss of the water of hydration. For efficiency and economy, dehydration at a temperature of 150–320° C. is generally used. It might occasionally be necessary for the regeneration temperature to be taken above 320° C., but not above the thermal stability temperature of the material which is about 565° C. Above the latter temperature the essential crystalline structure will begin to suffer destruction. As an alternative to providing a kiln for regeneration, spent or hydrated material may be discarded.

The zeolitic materials contemplated herein exhibit adsorptive properties that are unique among known adsorbents. The common adsorbents, such as charcoal and silica gel, show adsorption selectivities based primarily on the boiling point or critical temperature of the adsorbate. The aforementioned zeolitic materials, on the other hand, exhibit a selectivity based on the size and shape of the adsorbate molecules. Among those adsorbate molecules whose size and shape are such as to permit adsorption by the contemplated zeolites, a very strong preference is exhibited toward those that are polar, polarizable and unsaturated. For example, at 25° C. and 0.2 mm. Hg of pressure, 22.1 wt. percent of water is adsorbed by type A zeolite whereas only 0.1 wt. percent is adsorbed by charcoal and only 1.6 wt. percent is adsorbed by silica gel.

A slight excess of the zeolitic material is normally employed over that theoretically required for the removal of water. Assuming the use of anhydrous alcohol and dehydrated zeolite, the minimum amount of zeolitic material is about 180 grams per mole of metal hydroxide or its equivalent, e.g., 40 grams of sodium hydroxide, 56 grams of potassium hydroxide, etc.

Following the preparation of metal alkoxides, zeolitic material can be effectively employed for the preservation or restoration of the alcoholic solutions. Any suitable means, such as filtration or decantation, can be used to removed the zeolitic material from the alcoholic solutions.

The invention is illustrated by the following specific examples, it being understood that there is no intention to be necessarily limited by any details thereof since variations can be made within the scope of the invention.

EXAMPLE I 4 grams of sodium hydroxide are dissolved at room temperature in a liter of anhydrous ethanol to prepare a 0.1 molar solution. Type 4A molecular sieve is added to this solution in an amount equal to 18 grams per liter of solution. Upon equilibration, 0.1 molar sodium ethoxide is recovered in a quantitative amount from the solution.

Substantially equivalent results are obtained when hydroxides of other Group I, II and III metals of the periodic table are substituted for the sodium hydroxide and when both higher and lower alcohols are substituted for ethanol.

EXAMPLE II 56 grams of potassium hydroxide are dissolved at 40° C. in a liter of anhydrous isopropanol to prepare a 1 molar solution. Type 5A molecular sieve is added to this solution in an amount equal to 180 grams per liter of solution. 1 molar potassium isopropoxide is recovered in a quantitative amount from the solution following equilibration.

EXAMPLE III 11.95 grams of lithium hydroxide are dissolved at 25° C. in a liter of anhydrous methanol to prepare a 0.5 molar solution. Type 3A molecular sieve is added to this solution in an amount equal to 90 grams per liter of solution. Following equilibration, 0.5 molar lithium methoxide is recovered in a quantitative amount by filtration.

EXAMPLE IV 55 ml. of anhydrous acetone, 45 ml. of cyclopentadiene, 0.5 gram of potassium hydroxide and 10 cc. of anhydrous methanol were refluxed at 50 to 60° C. for 3 hours in an attempt to obtain dimethyl fulvene. Only insignificant conversion to dimethyl fulvene was obtained as indicated by a slight color change.

However, when the same reactants were refluxed under identical conditions in the presence of 1.6 grams of type 13X molecular sieve, dimethyl fulvene was obtained within ten minutes.

This example demonstrates the favorable shift in equilibrium obtained with the zeolitic materials since it is known that the catalysis of the reaction of this example does not occur in the presence of alcoholic hydroxide but does occur in the presence of the alkoxide ion.

EXAMPLE V

To restore a 0.2 molar alcoholic solution of aluminum t-butoxide and t-butyl alcohol containing 1.08 grams of water, 10.8 grams of type 13X dehydrated molecular sieve is added to the solution. The restored alcoholic solution thus obtained can be preserved by adding additional molecular sieve to the solution.

Thus, a novel system is provided by the present system for obtaining metal alkoxides starting with metal hydroxides and alcohol. Molecular sieve material not only establishes a favorable shift of equilibrium by removing water from the reaction system but also can be used to effectively preserve metal alkoxides which are obtained.

Obviously, any modifications and variations of the present invention as hereinbefore set forth may be made without departing from the spirit and scope thereof.

What is claimed is:

1. A method for the synthesis of a metal alkoxide which comprises reacting an alcohol and a metal hydroxide soluble in said alcohol selected from the group consisting of the hydroxides of Group I, Group II and Group III metals of the periodic table in the presence of molecular sieve adsorbent selected from the group consisting of type A and type X zeolites.

2. The method of claim 1 wherein the reaction is accomplished at a temperature between about 20 and about 60° C.

3. The method of claim 1 wherein the alcohol has the formula $C_nH_{2n+2}O$ where $n$ is 1 to 18.

4. The method of claim 1 wherein an excess of molecular sieve adsorbent over that theoretically required to remove water from the reaction is employed.

5. A method for the synthesis of a metal alkoxide which comprises reacting an alcohol having the formula $C_nH_{2n+2}O$ where $n$ is 1 to 18 with a metal hydroxide soluble in said alcohol selected from the group consisting of the hydroxides of Group I, II and III metals of the periodic table at a temperature between about 20 and about 60° C. in the presence of type A zeolite.

References Cited

UNITED STATES PATENTS

| | | |
|---|---|---|
| 1,910,331 | 5/1933 | Halbig. |
| 2,405,712 | 8/1946 | Russell. |
| 2,405,713 | 8/1946 | Russell. |
| 2,491,033 | 12/1949 | Byrns et al. |
| 2,796,443 | 6/1957 | Meyer et al. |
| 2,845,447 | 7/1958 | Carlson et al. |
| 2,877,274 | 3/1959 | Kramis. |
| 2,882,243 | 4/1959 | Milton. |
| 2,882,244 | 4/1959 | Milton. |
| 3,036,134 | 5/1962 | Mattox. |
| 3,377,294 | 4/1968 | Davis et al. |
| 2,825,655 | 3/1958 | Meadows _____ 252—194 |
| 3,336,392 | 8/1967 | Schwarzenbach __ 260—429.9 XR |

FOREIGN PATENTS

| | | |
|---|---|---|
| 1,063,591 | 8/1959 | Germany. |

TOBIAS E. LEVOW, Primary Examiner

H. M. S. SNEED, Assistant Examiner

U.S. Cl. X.R.

260—429, 429.9, 430, 431, 438.1, 632, 632.5